United States Patent [19]
Marschalko et al.

[11] 3,971,910
[45] July 27, 1976

[54] APPARATUS FOR PERFORATING CONTACT LENSES

[76] Inventors: Cornell S. Marschalko, 3401 N. Emerson St., Arlington, Va. 22207; George K. Meszaros, 4616 48th St., NW., Washington, D.C. 20016

[22] Filed: Jan. 16, 1975

[21] Appl. No.: 541,692

Related U.S. Application Data

[62] Division of Ser. No. 173,612, Aug. 20, 1971.

[52] U.S. Cl. .......................... 219/121 L; 51/216 LP
[51] Int. Cl.² .......................................... B23K 27/00
[58] Field of Search ......... 219/121 L, 121 LM, 384; 51/216 LP, 235, 237 R, 284; 269/21, 57, 58

[56] References Cited
UNITED STATES PATENTS

| | | | |
|---|---|---|---|
| 2,444,531 | 7/1948 | Richardson | 51/235 |
| 3,084,928 | 4/1963 | Opitz | 269/21 |
| 3,382,343 | 5/1968 | Muncheryan | 219/121 L |
| 3,528,326 | 9/1970 | Kilmer et al. | 51/235 |
| 3,619,550 | 11/1971 | Matthews | 219/121 L |

OTHER PUBLICATIONS

H. S. Silvus, Jr. et al., "Precise Perforations Every Time," The Tool and Manufacturing Engineer, 11/1969, pp. 46–49.

*Primary Examiner*—J. V. Truhe
*Assistant Examiner*—Clifford C. Shaw
*Attorney, Agent, or Firm*—Cushman, Darby & Cushman

[57] ABSTRACT

Apparatus for perforating contact lenses, including a laser, a hollow motor driven shaft connected to a vacuum pump for centering and holding the contact lens under the laser beam, crank means for adjusting the vertical and horizontal position of the contact lens with respect to the laser beam and automatic means for rotating said lens under said beam synchronously with the energization of said laser to effect production of a plurality of holes on said lens.

4 Claims, 1 Drawing Figure

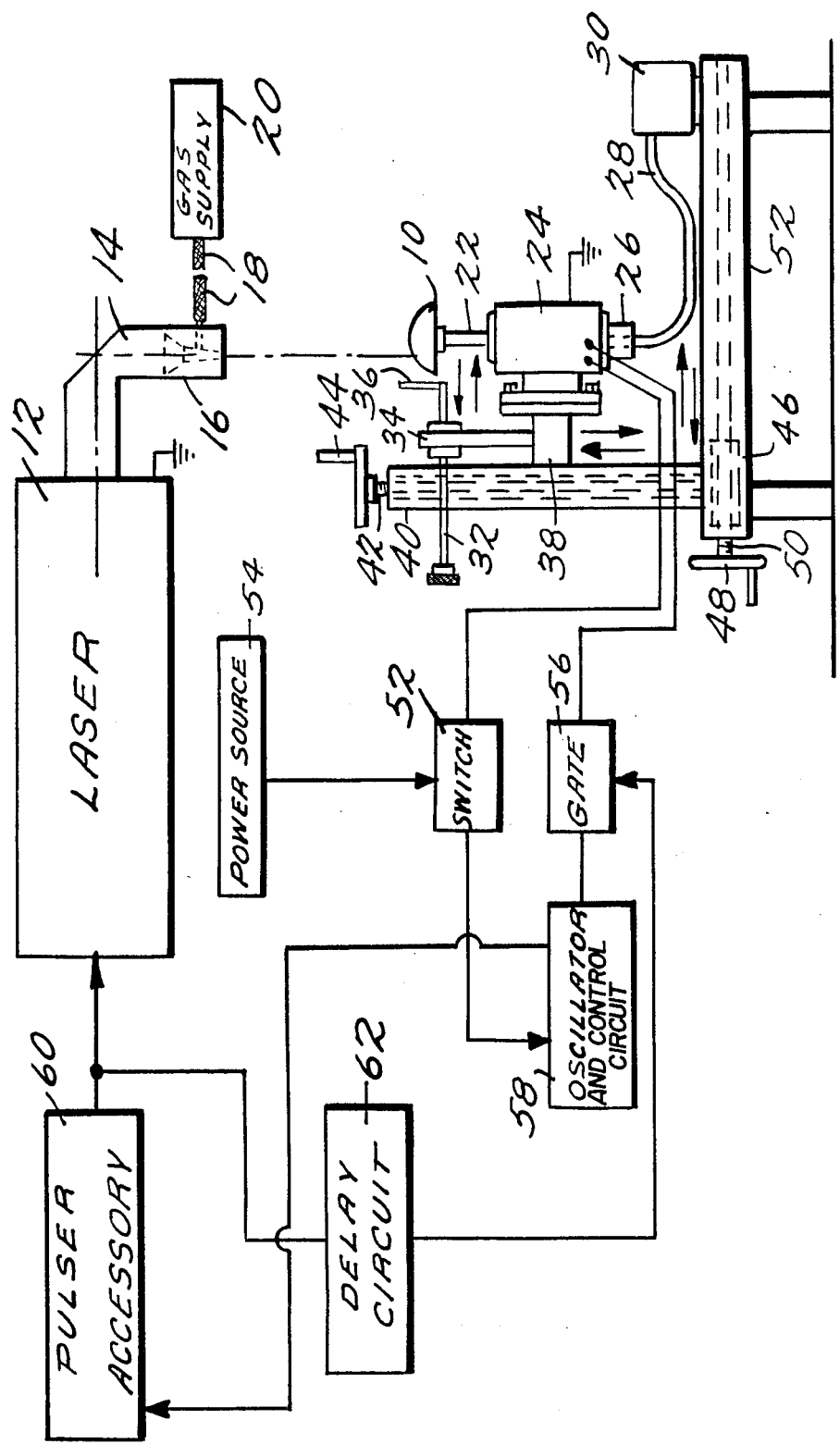

APPARATUS FOR PERFORATING CONTACT LENSES

This is a division, of application Ser. No. 173,612 filed Aug. 20, 1971.

BACKGROUND OF THE INVENTION

1. Field of the Invention

This invention relates to apparatus and methods for forming holes in contact lenses.

2. Description of the Prior Art

It is well known to those skilled in the art of fitting contact lenses that providing sufficient oxygenation of the cornea has always been a significant problem. When the cornea receives insufficient oxygen because of the contact lens fitted thereover and gases cannot escape from the cornea because of the contact lens, edema or swelling of the cornea results. The predominant method of achieving the flow of oxygen to and gases from the space between the contact lens and the cornea is by creating a certain amount of standoff at the edge of the lens which allows an adequate tear flow around the lens. However, in certain cases even this standoff is insufficient to provide an adequate tear flow in these cases fenestrating or drilling of holes in the contact lens is the only practical solution to provide a sufficient tear flow. Thus, it is known to the prior art to mechanically drill one or more holes in the contact lens.

In order to insure comfort for those wearing contact lenses which had been drilled holes had to be polished and blended to the interior and exterior surfaces of the lens. This operation required delicate manipulations and a good deal of time which resulted in a substantial increase in cost for the contact lenses even if the number of holes was kept to a minimum.

SUMMARY OF THE INVENTION

It is one object of the applicant's invention to facilitate production of holes in contact lenses in a manner which does not require subsequent polishing and blending steps. This object is accomplished by applicant's apparatus which includes a carbon dioxide laser of 50 watts maximum power which is operated at a 20 watt power level with a pulse length of approximately 1 millisecond. The beam produced by the carbon dioxide laser is focused upon a lens which has been placed upon the upper end of a vertically disposed hollow shaft. The hollow shaft is adapted to be rotated by an attached motor and includes a connection to a vacuum pump means whereby the lens may be firmly urged to the end of the shaft. When the motor is rotated a rigid member may be contacted with the edge of the contact lens so as to center it with respect to the hollow shaft. Of course, the external diameter of the hollow shaft must be smaller than the diameter of a contact lens to be centered. The hollow shaft and its rotating motor are mounted upon a platform which includes adjusting means in both the horizontal and vertical directions. The horizontal adjusting means is used to adjust the lens with respect to the beam from the laser so that the laser beam intersects the lens at a portion outward from the hollow shaft while the vertical adjustment means is used to position the contact lens with respect to the focal point of the beam in such a manner as to produce holes completely through the contact lens. Automatic circuitry is included to synchronize the laser energization with the motor so that the contact lens may be rotated on its shaft as the laser beam is periodically energized to produce the plurality of holes at a common radius.

The applicant, a skilled artisan in the art of contact lens fitting was able after a long period of experimentation with pulse duration, power output of lasers and the adjustment of a contact lens with respect to the focal length of the laser beam to produce holes completely through the contact lens which tapered from a maximum entry diameter 0.006 inch to an exit diameter of 0.004 inch and which produced on either edge a flare of less than 0.0004 inch in height. In other words, the applicant besides discovering an efficient method for producing holes in contact lenses in addition unexpectedly discovered that holes produced in accord with his invention did not require subsequent polishing as the eyelids and cornea of a normal human being are not affected by a thickness on the order of 0.0004 inch.

BRIEF DESCRIPTION OF THE DRAWINGS

The preferred embodiment of the applicant's invention will now be described with reference to the drawings in which FIG. 1 portrays the applicant's apparatus in a generally schematic form.

DETAILED DESCRIPTION OF THE PREFERRED EMBODIMENT

Referring to FIG. 1, an apparatus is shown for perforating the contact lens 10. This apparatus includes a laser 12 which is preferably capable of producing a 20 watt output power in a pulse length of about one millisecond. An example of a suitable laser is the Model 42 carbon dioxide, laser produced by Coherent Radiation Laboratories of Palo Alto, Calif. The output beam from laser 12 is deflected by 90° in a conventional beam bender 14 and then passes through the conventional blast nozzle 16 which directs a stream of gas downward towards the lens 10 to prevent vaporized plastic due to the perforating operation from coating the beam bender. The blast nozzle 16 is connected by a hose 18 to a supply of gas 20.

The lens 10 is supported on the upper end of hollow shaft 22 which is of a smaller outer diameter than the circumferential dimater of the lens. The hollow shaft is fixedly connected to motor 24 so as to rotate about its longitudinal axis when the motor is energized. In addition, the lower end of shaft 22 is connected through rotary union 26 and tubing 28 to vacuum pump 30 so that a vacuum is drawn on shaft 22 and the lens 10 is pressed against the top thereof by ambient air pressure.

Adjacent to the upper end of shaft 22 a centering lever 32 is pivotally mounted on shaft 34 which is substantially parallel to shaft 22. The centering lever 32 an upwardly protruding pin 36 which is also parallel to shaft 22 and lever 32 is disposed with respect to shaft 22 so that at one position the pin 36 engages the edge of lens 10. Thus, when the lever 32 is in the above mentioned position and shaft 22 is rotated at least one complete revolution the lens 10 is centered thereupon. It is noted that pin 36 may then be pivoted away from the edge of lens 10 to the position shown in FIG. 1 prior to further operations upon lens 10.

The shaft 34 and motor 24 are both fixedly mounted to a carriage 38 which, in turn, is slidably mounted in guide 40, the carriage 38 is so attached to the screw 42 disposed within guide 40 as to be vertically movable when the crank handle 44 which is mounted to the end of screw 42 is rotated.

Likewise, the guide 40 is mounted upon carriage 46 which is horizontally movable by means of crank handle 48 and screw 50 to which carriage 46 is connected. Screw 50 is, in turn, mounted to rotate in brackets in the support table 52.

The motor 24 is directly connected through a three position swith 52 to standard electrical power source 54. In addition, motor 24 is also indirectly connected to power source 54 through switch 52, oscillator and control circuit 58 and gate 56. An opening signal is provided to gate 56 by the conventional laser pulser accessory 60 which provides operating pulses to the laser 12 and delay circuit 62.

The operation of the above described device is as follows: With switch 52 at its "off" position, the lens 10 is placed upon shaft 22 convex side up and the crank handle 44 is rotated to properly position lens 10 with respect to the focal position of laser 12 so that the laser, when energized, will produce a hole completely through the lens.

Next, the three position switch 52 may be turned to a first on position to directly connect motor 24 to power source 54 to cause shaft 22 to rotate. The vacuum pump 30 may be energized to place a vacuum on shaft 22. Then, pin 36 is pivoted into its position closest to shaft 22 where it engages the edge of rotating lens 10 to center the lens on shaft 22. Now, crank handle 48 may be rotated to position lens 10 with respect to laser 12 so that the laser beam will intersect lens 10 at a position outside of shaft 22 and preferably near the edge of the optic zone of the lens. Laser 12 produces, in a properly positioned lens, an entry hole of about 0.006 inch diameter and an exit hole of about 0.004 inch diameter. If the pulse duration and power output are properly adjusted through accessory 60 to values of, for example, 1 millisecond and 20 watts no appreciable warping of lens 10 will accompany the perforating operation. The second "on" position of switch 52 also connects oscillator and control circuit 58 to power source 54 so that the oscillator 58 produces a square wave output. This output forms the power input to gate 56 but is not passed through gate 56 until a signal is received from pulser accessory 60 and delay circuit 62. Thus, a system is provided for synchronizing the operation of laser 12 with motor 24 so that a plurality of holes may by automatically formed in a ring through lens 10.

While the above description fully covers the preferred embodiment of the applicant's invention, many modifications may be made within the scope of the invention. Thus, for example, a more economical system may dispense with the electronic system whence the shaft 22 may be indexed by a mechanical ratchet arrangement or even by hand. Likewise, a Geneva gear system may be connected between motor 24 and shaft 22 to index shaft 22.

In addition, while a single ring of 18 to 24 holes will usually suffice to provide adequate tear flow it may be desired to include concentric rings and the holes in these rings may be in phase or offset with respect to one another.

What is claimed is:

1. Apparatus for forming holes through a contact lens comprising: means for generating a laser beam capable of forming a hole through a contact lens; a carriage; means for supporting said carriage and for adjusting the position of the same along a path extending normal to the direction of the laser beam; an electric motor fixed to said carriage; a hollow open-ended index shaft of lesser diameter than a contact lens arranged coaxial with said motor, said index shaft being supported by and rotatably driven about its axis by said motor; motor control means for controlling said motor to index said shaft about its axis; means for applying a vacuum to the interior of the shaft whereby a contact lens placed on the open end of the index shaft will be held in contact with said end; a lens centering device supported by said carriage, said device including a lens-engagable member adjustable toward and away from the axis of said index shaft for engaging the edge of a contact lens to thereby center the lens with respect to said index shaft.

2. Apparatus as in claim 1 wherein said lens-engageable member is a pin fixed to one end of a support member, and means mounting said support member for movement toward and away from said index shaft.

3. Apparatus as in claim 2 wherein said lens-centering device further includes a fixed shaft secured at one end to said carriage, said mounting means for said support member cooperating with said fixed shaft to permit swinging movement of said support member.

4. Apparatus for forming holes through a contact lens comprising: means for generating a vertically downwardly directed laser beam capable of forming a hole through a contact lens; a vertical guide disposed below and offset from the path of the laser beam; a vertically movable carriage mounted in said vertical guide for movement therealong; means for adjusting the vertical position of said carriage; an electric motor supported on said carriage; a vertical hollow index shaft of lesser diameter than a contact lens, said index shaft having an open upper end and being rotatably driven about its axis by said motor; motor control means for controlling said motor to index said shaft about its axis; means for applying a vacuum to the interior of said index shaft whereby a contact lens placed on the open upper end of said index shaft will be held in contact with said upper end; means for centering a contact lens with respect to the axis of the index shaft, said means including a fixed vertical shaft supported at its lower end on said carriage, a lever pivotally mounted on said fixed shaft for swinging movement about the axis of said shaft and a vertical pin carried by said lever, said pin being engageable upon pivotal movement of said lever with the edge of a contact lens being held in contact with the upper end of said index shaft; a horizontal guide located below said vertical guide; a horizontally movable carriage connected to the lower end of said vertical guide and mounted in said horizontal guide for movement therealong; and means for adjusting the horizontal position of said horizontally movable carriage.

* * * * *